United States Patent [19]

Davis et al.

[11] Patent Number: 5,104,551

[45] Date of Patent: Apr. 14, 1992

[54] METHOD OF FLOCCULATING CLAY-CONTAINING WASTE SLURRIES

[75] Inventors: Janice G. Davis, Lawrenceville, Ga.; Gary M. Wilemon, Tuscaloosa; Bernard J. Scheiner, Northport, both of Ala.

[73] Assignee: The United States of America as represented by the Secretary of the Interior, Washington, D.C.

[21] Appl. No.: 596,669

[22] Filed: Oct. 11, 1990

[51] Int. Cl.⁵ .............................................. C02F 1/56
[52] U.S. Cl. .................................... 210/727; 210/728; 210/730; 210/732; 210/734; 210/907; 209/5
[58] Field of Search ............... 210/727, 728, 730, 732, 210/907, 734; 209/5

[56] References Cited

U.S. PATENT DOCUMENTS

| | | | |
|---|---|---|---|
| 2,937,143 | 5/1960 | Goren | 210/730 |
| 3,020,231 | 2/1962 | Colwell et al. | 210/732 |
| 3,338,828 | 8/1967 | Clark | 210/730 |
| 4,251,363 | 2/1981 | Chamberlain et al. | 210/907 |
| 4,265,770 | 5/1981 | Thomas | 210/907 |
| 4,931,190 | 6/1990 | Laros | 210/907 |

Primary Examiner—Peter Hruskoci
Attorney, Agent, or Firm—E. Philip Koltos

[57] ABSTRACT

A process for improving a solid/liquid separation of tails from acidulated or non-acidulated liquors obtained by leaching phosphate ores or waste comprising: adding a mixture of dissolved polymers of hydroxyalkyl cellulose and polyoxyethylene into an aqueous slurry of leached phosphate wastes to obtain flocks of phosphatic clay wastes; allowing said flocks to settle into an agglomerated mass; decanting luqiid from insoluble residues to obtain tails having a solid content from about 55 to 70%.

15 Claims, 3 Drawing Sheets

METHOD OF FLOCCULATING CLAY-CONTAINING WASTE SLURRIES

BACKGROUND OF THE INVENTION

1. Field of the Invention

The present invention relates generally to a process for flocculation of clay-containing waste slurries in order to obtain improvement in the settling or filtration characteristics of slurries containing clays. This includes slurries high in acid concentrations ($H_2SO_4$, $HNO_3$ and $HCl$) as well as slurries containing very little or no acid. More particularly, the invention pertains to a process of selecting a combination of polyethylene oxide with hydroxypropyl cellulose or polyethylene oxide with hydroxyethyl cellulose in order to flocculate clay slurries in aqueous and organic solvents. The invention also entails the use of polyethylene glycol with hydroxypropyl cellulose and polyethylene oxide to flocculate these clay-containing slurries. Flocculation of the clay slurries in an organic solvent at a low pH enables viable recovery of $P_2O_5$ values from currently unused sources and allows removal of $P_2O_5$ values from leach residues that filter or settle poorly. The invention further entails the use of hydroxypropyl cellulose or hydroxyethyl cellulose with polymers such as polyethylene oxide to increase the settling rates of clay slurries in aqueous or organic solvents. Further still, the invention includes the use of hydroxyethyl cellulose or hydroxypropyl cellulose in combination with a high molecular weight anionic polyacrylamide to flocculate aqueous slurries of phosphatic clay waste and the use of hydroxyethyl cellulose or hydroxypropyl cellulose as settling aids for aqueous phosphatic clay waste slurries.

2. Description of the Prior Art

It is known that the beneficiation of phosphate ore generates a waste stream containing clay and having a solid content of approximately 2 to 6% (Stowasser, W. F. Phosphate Rock. Ch. in Mineral Facts and Problems, 1985 Edition. BuMines B 675, 1985, pp. 579-594; Becker, P. Phosphates and Phosphoric Acid. Marcel Dekker, Inc., 1983, 585 pp; and U.S. Bureau of Mines. The Florida Phosphate Slimes Problem—A Review and a Bibilography. IC 8668, 1975, 41 pp.). This material, also called phosphatic clay waste or phosphate slime, is discarded into waste ponds. Because of the colloidal character of the waste, it settles very slowly and after years it may still contain more than 70% water. Therefore, the manner of disposal, which ties up large quantities of land and water, is an important environmental concern. Because of this, finding ways to rapidly dewater clay wastes has been the subject of much research.

In this regard, polymers such as polyethylene oxide (PEO) and anionic polyacrylamides have shown promise (Scheiner, B. J. and G. M. Wilemon. Applied Flocculation Efficiency: A Comparison of Polyethylene Oxide and Polyacrylamides. Paper in Flocculation in Biotechnology and Separation Systems, ed. by Y. A. Attia (Inter. Symp. on Flocculation in Biotechnology and Separation Systems, San Francisco, CA, Jul. 28-Aug. 2, 1986). Elsevier, 1987, pp. 175-185.).

Another problem is that a considerable amount of the phosphate present in untreated ore is lost when the waste is discarded. In the case of waste ponds in Florida, said ponds approximately cover 90,000 acres and contain about ⅓ of all of the phosphate ever mined. This represents millions of tons of unrecovered phosphate.

Because of the fact that current phosphate deposits are decreasing in quality, the ability to recover phosphate values from the waste would greatly increase the domestic reserve.

Some efforts have been made to circumvent the loss of this phosphate by directly acidulating phosphate ore using $H_2SO_4$ (White, J. C., T. N. Goff, and P. C. Good. Continuous-Circuit Preparation of Phosphoric Acid From Florida Phosphate Matrix. BuMines RI 8326, 1978, 22 pp; White, J. C., A. J. Fergus, and T. N. Goff. Phosphoric Acid by Direct Sulfuric Acid Digestion of Florida Land-Pebble Matrix. BuMines RI 8086, 1975, 12 pp; Good, P. C., T. N. Goff, and J. C. White. Acidulation of Florida Phosphate Matrix in a Single-Tank Reactor. BuMines RI 8339, 1979, 16 pp.).

While this acidulating technique with $H_2SO_4$ does leach 90+% of the phosphate from the ore, there are two distinct disadvantages to this approach. First, the crude acids prepared by direct acidulation are not of sufficient purity to be considered fertilizer precursors (the major end use of wet-processed acid); and secondly, the action of the $H_2SO_4$ on the matrix generates an insoluble residue having a very small average particle size, and this makes solid/liquid separation of the acid from the residue slow and difficult.

Recent efforts at the BUREAU OF MINES involve leaching phosphate values from wastes using $H_2SO_4$ in the presence of methanol. While the organic solvent serves to depress the solubility of impurities and thereby improve the quality of the crude acid generated, the leach slurries still contain an insoluble clay component that must be separated from the crude acid product. In this process, leach slurries may be filtered, but the filtrations are slow and the filter cakes are tight and very difficult to wash, and this results in a loss of phosphate as well as handling problems.

SUMMARY OF THE INVENTION

Accordingly, it is the object of the present invention to use a combination of polyethylene oxide (PEO) with hydroxypropyl cellulose (HPC) or a combination of polyethylene oxide and hydroxyethyl cellulose (HEC) for flocculation of clay slurries in aqueous and organic solvents to obtain better flocculated yields than when using PEO alone.

It is another object of the present invention to use polyethylene glycol with HPC and PEO to flocculate clay slurries.

A yet further object of the present invention is to provide a process for flocculation of clay slurries in an organic solvent at low pH's.

A further object yet still is to provide a process for more viable recovery of $P_2O_5$ values from currently unused sources.

Finally, it is an object of the present invention to provide a process which allows removal of $P_2O_5$ values from leach residues that filter or settle poorly.

Paramount to the aforementioned objectives are: the use of HPC or HEC with polymers such as PEO to increase the settling rates of acidulated or unacidulated clay slurries in aqueous or organic solvents; the use of HEC or HPC in combination with a high molecular weight anionic polyacrylamide to flocculate aqueous slurries of phosphatic clay waste; and the use of HEC or HPC as settling aides for aqueous phosphatic clay waste slurries.

In achieving the foregoing and other objects in accordance with the process of the present invention as embodied and broadly described herein, the flocculation process in general is one in which a polymer plus another additive produces results superior to those obtained by the use of a polymer alone. Thus, the invention covers the use of flocculants now used in industry i.e. polyacrylamide or PEO together with other additives or the use of these additives alone to flocculate aqueous slurries of clay, and the system used to demonstrate the novel process will involve slurries obtained from the acid leaching of phosphatic clay waste in methanol, water, acetone and unacidulated aqueous slurries of phosphatic clay wastes.

DETAILED DESCRIPTION OF THE INVENTION

In general, it is important to appreciate that leaching of phosphate values from phosphate-containing waste is not useful unless a facile method for separating the insoluble gangue material from the desired leach liquor is available.

In the present invention, solid/liquid separation of phosphatic clay waste acidulated in the presence of methanol is accomplished by using a combination of hydroxypropyl cellulose (HPC) having a molecular weight greater than 1,000,000 and polyethylene oxide (PEO) having a molecular weight greater than 5,000,000 to flocculate the slurries. The polymers may be dissolved in either methanol or water, and the range of dosage addition is between 0.02 to 0.50 lb/ton. Varying degrees of flocculation and settling enhancement is apparent, but the best results are obtained when the dosage of each polymer added is 0.1 lb/ton or more, and when the HPC is added prior to the addition of the PEO, and when the HPC is added as an aqueous solution. Large strong flocks are formed that settle rapidly into an agglomerated mass. The acid product is then decanted from the insoluble residues. The final percent solids of the leached tails ranges from 55 to 75%. Successful coagulation is achieved at ambient temperatures and at atmospheric pressure.

Solid/liquid separation of phosphatic clay wastes using the process of the invention employing hydroxyethyl cellulose (HEC) dissolved in water, and substituted for the hydroxypropyl cellulose and added with polyethylene oxide (dissolved in methanol or water) produces similar results to the slurry when using hydroxyethyl cellulose dosages of 0.05 to 0.15 lb/ton HEC and 0.05 to 0.10 lb/ton of PEO, and is sufficient to achieve particle agglomeration. However, the combination of hydroxyethyl cellulose and polyethylene oxide produces better settling when both of the polymers are added as aqueous solutions where the HEC to PEO ratios are 1:1, 2:1, and 3:1.

Solid/liquid separation of phosphatic clay wastes slurried in water may also be accomplished by using polyacrylamide in conjunction with hydroxyethyl cellulose. In this embodiment, aqueous phosphatic clay waste slurries are treated with HEC, or with a high molecular weight (greater than 10,000,000) anionic polyacrylamide, or with a combination of HEC and the polyacrylamide. Polymer dosages ranging from about 0.05 to 1.5 lb/ton are used. Successful flocculation is achieved when the total polymer dosage is at least about 0.10 lb/ton.

Figure 1:
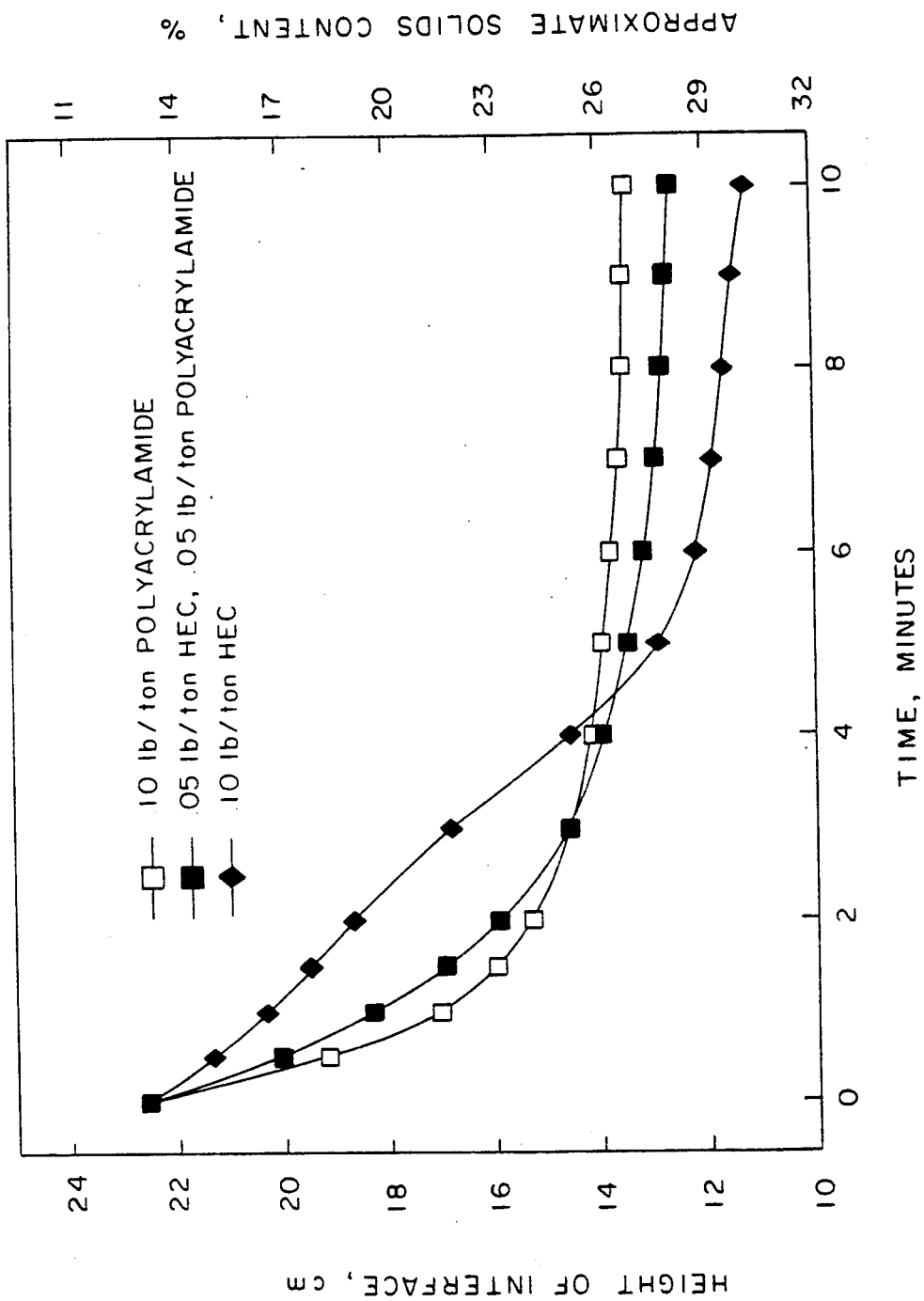
FIG. 1 is a comparison of settling rates for aqueous phosphatic clay wastes when treated with aqueous solutions of an anionic polyacrylamide, hydroxyethyl cellulose, or a combination of the two.

In referring to FIG. 1 for an embodiment of the invention using polyacrylamide plus hydroxyethyl cellulose, it is shown that the settling rates of the combination and polyacrylamide alone are about the same, but there is more consolidation of the solids when the combination is used. The supernate of the slurry treated with the combination is clearer than that of the slurry treated with polyacrylamide alone, where the turbidity measurements were 94 and 310 NTU respectively. When hydroxyethyl cellulose is used alone, the consolidation of the solids is higher than that of the other two cases evaluated. The supernate of this run is very clear.

SAMPLING PROCEDURES

Settling Test Procedure Using Phosphatic Clay Waste

The samples used in these tests were obtained by leaching 600 g of phosphatic clay waste (ground to minus 28-mesh) with $H_2SO_4$ (the acid-to-apatite molar ratio=6) in 1200 ml of methanol. The acid was added over a period of 30 minutes and the slurry was allowed to stir for an additional 30 minutes. At the end of this time period and while the slurry was under agitation, 200 ml samples of the slurry were siphoned into 250 ml mixing cylinders. Each cylinder received approximately 80 g of ore, corresponding to a percent solids of 36 to 38. Polymers were added to the cylinders using 5 and 10 ml syringes. The cylinders were inverted five times after each polymer addition to ensure proper mixing. When PEO was added alone to a cylinder, the dosage was added in a ratio to simulate the addition of HPC prior to the addition of PEO. The tests were timed over a period of 30 minutes. Graphs showing the height of the interface versus time are plotted.

Settling Test Procedure for HEC and Anionic Polyacrylamide

Forty grams of phosphatic clay waste were thoroughly mixed with 200 g of water in a 250 ml mixing cylinder. Polymer dosages ranging from 0.05 to 0.50 lb/ton were tested. In tests where a combination of HEC and polyacrylamide was added to the clay/water slurry, the HEC was always added first. The cylinder was inverted five times after each polymer treatment to evenly distribute the flocculant. When polyacrylamide was added alone, it was added in the same amount as experiments where the combination was used to simulate the addition of the HEC prior to the addition of the polyacrylamide. The settling tests were timed over a period of 30 minutes.

Figure 2:
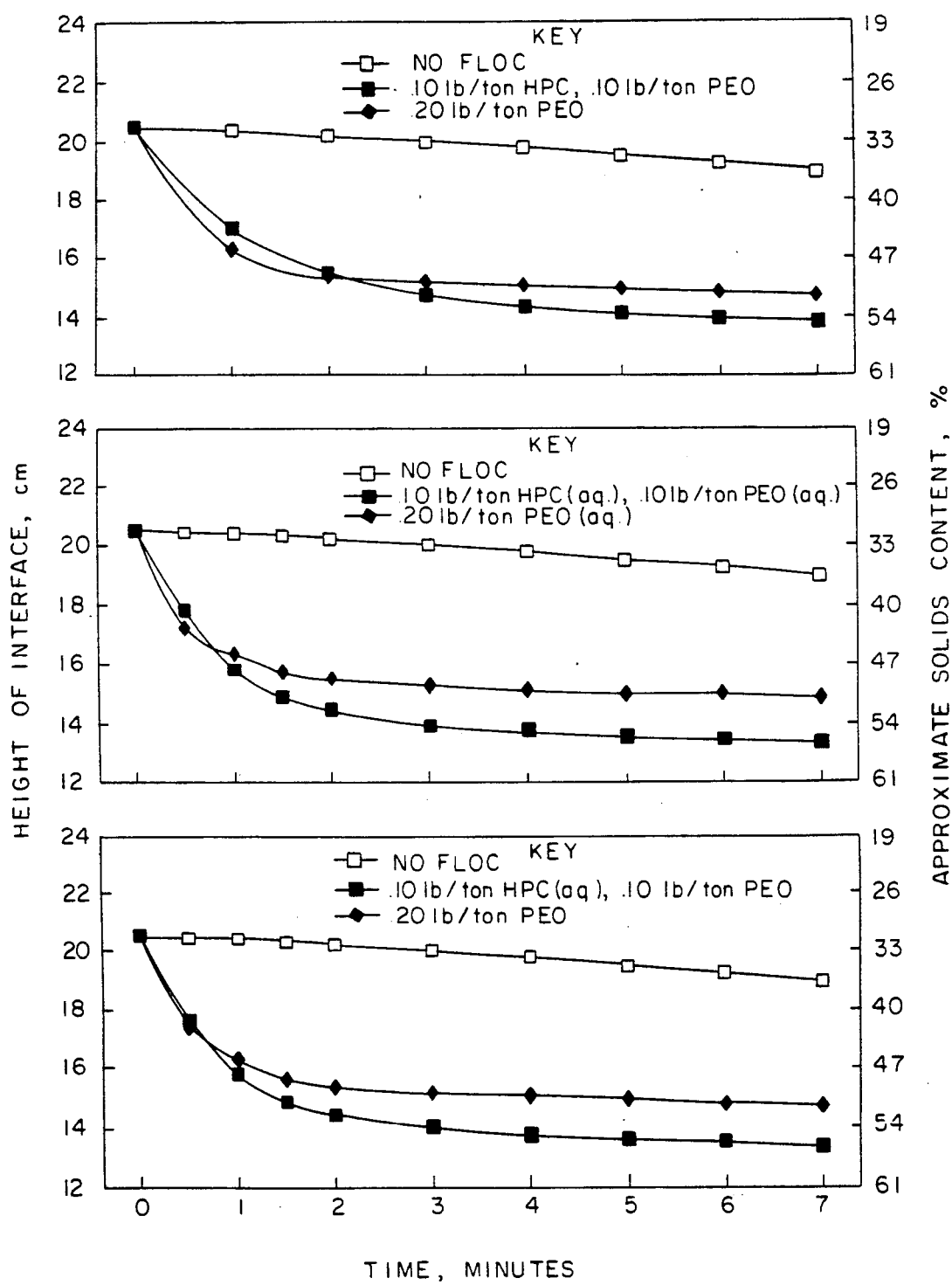
FIG. 2 is a comparison of settling rates for slurries obtained by $H_2SO_4$ leaching of phosphatic clay waste and methanol when treated with polyethylene oxide or polyethylene oxide hydroxypropyl cellulose.
Figure 3:
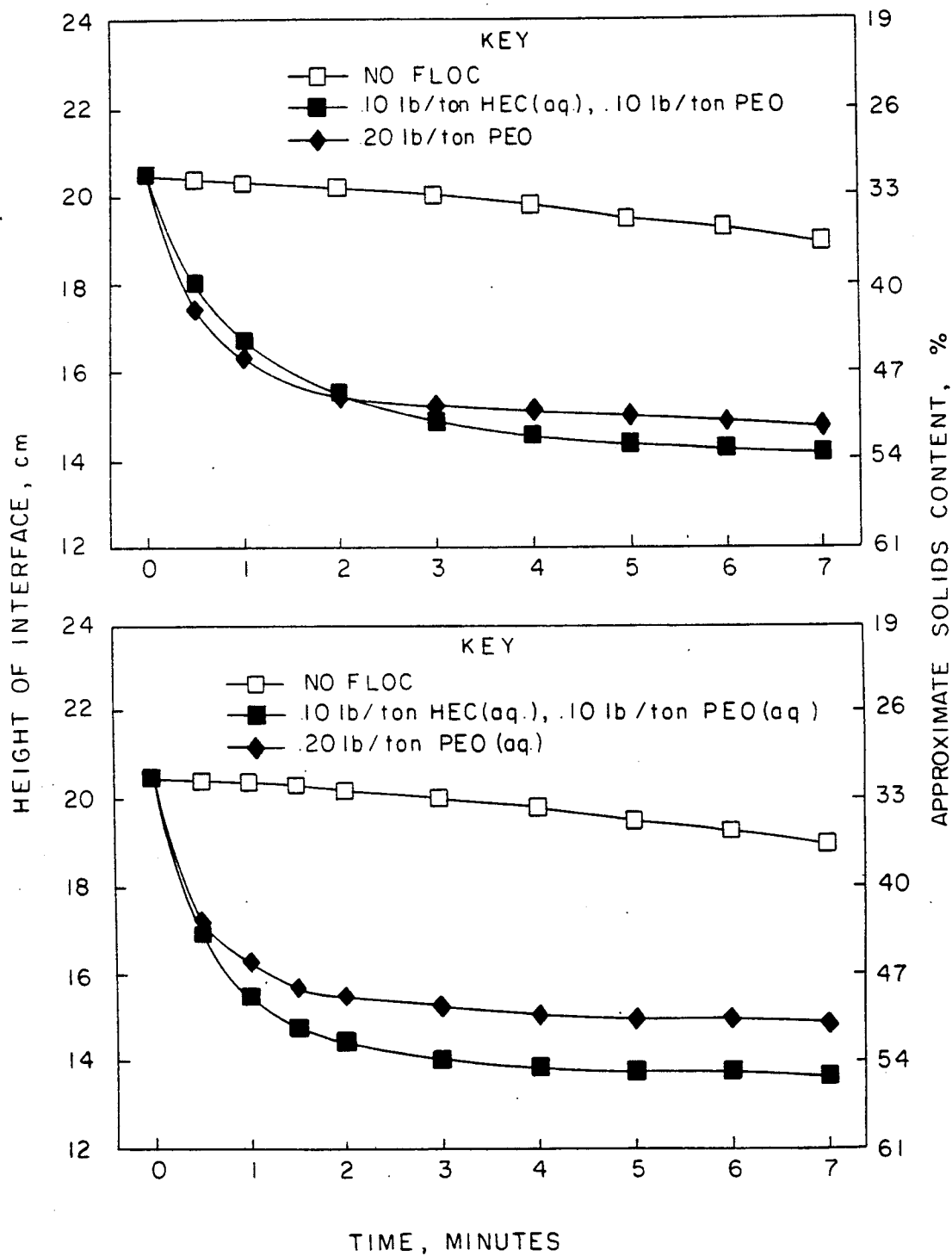
FIG. 3 is a comparison of settling rates for slurries obtained by $H_2SO_4$-leaching of phosphatic clay waste in methanol when treated with oxide or polyethylene oxide/hydroxyethyl cellulose.

Polyvinyl acetate (PVAc) and polyethylene oxide (PEO) have been shown to improve the filtration of leach slurries, but the resulting filter cakes were very tight and extremely difficult to wash. The HPC/PEO flocculation allowed removal of the acid product using a series of thickening steps and countercurrent decantation. The bonding of the flocks was so strong that the use of screening for solid-liquid separation might also be employed. The settling rates of leached slurries flocculated with PEO, HPC/PEO or HEC/PEO were about the same; however, more consolidation was achieved using the polymer combinations, as shown in FIGS. 2 and 3. As can be seen from these Figures, the material settles slowly when no polymer is added. When PEO is added, the settling rate increases. The fastest settling rate is achieved with PEO plus HPC or HEC. Collection of the product acid by filtration after flocculation with HPC/PEO or PEO alone indicated that the addition of HPC to the PEO decreased the PEO's shear sensitivity. As shown in table 1, multiple tests using a polymer dosage of 0.20 lb/ton of PEO or 0.10 lb/ton HPC and 0.10 lb/ton PEO showed that more filtrate was collected when the combination was used. A greater range of filtrate collection was also observed when the slurries were treated with PEO alone. This data appears to indicate that the PEO flocks are not as strong as those obtained using the polymer mixtures, because if too much shear is added during the mixing, the PEO flocks will fall apart. These results show that PEO plus HEC or HPC enhances filtration better than does PEO alone.

TABLE 1

Results of filtration tests using PEO and a combination of PEO and HPC:

| Filtration time, s | Grams of filtrate collected (polymer dosages in lb/ton) | |
|---|---|---|
| | HPC, 0.10 PEO, 0.10 | PEO, 0.20 |
| 120 | 191 | 188 |
| | 189 | 153 |
| | 190 | 181 |
| | 186 | 180 |
| | | 183 |
| | avg: 189 | 177 |
| 60 | 175 | 151 |
| | 178 | 168 |
| | 178 | 177 |
| | 178 | 166 |
| | 177 | 177 |
| | 174 | 179 |
| | 178 | 136 |
| | avg: 177 | 165 |
| 30 | 168 | 155 |
| | 169 | 172 |
| | 174 | 163 |
| | 173 | 158 |
| | 166 | 159 |
| | 172 | 171 |
| | 153 | 147 |
| | 173 | 167 |
| | avg: 169 | 162 |

In general, alternate embodiments for practicing the invention may be performed in a diversity of ways, not the least of which are as follows:

A. Flocculation of aqueous slurries of phosphatic clay waste leached with HCl occurred when HEC (aqueous) was added in combination with PEO (aqueous) to the leach slurry. Polymer dosages ranging from 0.20 to 0.40 lb/ton HEC and 0.12 to 0.52 lb/ton PEO were required;

B. Adding polyethylene glycol (PEG) reduced the amount of HPC required for flocculation. Slurries obtained from the acidulation of phosphatic clay waste with sulfuric acid in methanol flocculated well when 0.05 to 0.25 lb/ton of PEG was added along with 0.05 lb/ton of HPC and 0.10 to 0.50 lb/ton of PEO. All polymers were used as solutions in methanol;

C. Phosphatic clay waste, leached with $H_2SO_4$ and using acetone as the solvent, was flocculated using 0.60 lb/ton of HPC and 0.60 lb/ton PEO (polymers were methanol solutions). When the polymers were used as acetone solutions, dosages of 1.0 lb/ton and 1.4 lb/ton, respectively, were required;

D. Phosphate ore leached with $H_2SO_4$ in water was treated with aqueous solutions of HEC and PEO. Two different ores were tested. One ore required 1.2 lb/ton HPC and 1.6 lb/ton PEO to achieve particle agglomeration. The other ore, however, required only 0.40 lb/ton of HEC and 0.28 lb/ton PEO;

E. Two Florida primary phosphate slime samples (minus 150-mesh fraction mining cut) were flocculated using 0.10 lb/ton HEC and 0.10 lb/ton PEO (aqueous polymer solutions);

F. A sample of Idaho phosphate waste tailings (minus 150-mesh fraction mining cut) leached with $H_2SO_4$ in methanol was flocculated with 0.30 lb/ton HEC (aqueous) and 0.30 lb/ton PEO (in methanol); and G. A sample of leach zone material from a Florida phosphate producer was leached with nitric acid in methanol. The resulting slurry was successfully flocculated by adding 0.12 lb/ton of HPC and 0.04 lb/ton of PEO (both polymers dissolved in methanol).

It is apparent that the invention will find extensive use in all applications requiring an improvement in the settling or filtration characteristics of slurries containing clays, and this includes both slurries high in acid concentrations (i.e. $H_2SO_4$, $HNO_3$ HCl as well as and slurries containing very little or no acid at all. However, the invention is particularly suitable in the hydrometallurgical processing of ores and concentrates, where solid/liquid separation is required during the processing sequence, and when the slurries contain clay particles which make the solid/liquid separation much more difficult, as in the case of ultra-fine clays associated with a phosphate ore, where the leach tailings are non-crystalline in structure and the use of filtration for separation yields a tightly bound cake that filters slowly and is difficult to wash, and wherein inefficient washing results in lower product recoveries.

Moreover, even in the case when filtration of leached phosphatic clay slurries are enhanced by the addition of PEO or polyvinyl acetate (PVAc), the washing step is still very slow, and it is a conclusion in view of this that filtration is not a very viable method for the separation of leach residues from leach acids (Wilemon, G.M. and B.J. Scheiner. Extraction of Phosphate Values from Phosphatic Clay Waste: An Acid-Alcohol Technique. Ch. in Challenges In Mineral Processing, ed. by K. V. S. Sastry and M. C. Fuerstenau. Soc. Min. Eng. AIME, Littleton, Co. 1989, pp. 421–436. Wilemon, G. M., R. G. Swanton, J. G. Davis, and B. J. Scheiner. Leaching of Phosphate Values From Phosphate Wastes Using $H_2SO_4$-Methanol Mixtures. Pres. at Metall. Soc. AIME Annual Meeting, Las Vegas, NV, Feb. 27–Mar. 2, 1989. Metall. Soc. AIME Paper No. A89-4, 17 pp.).

While the foregoing descriptions and illustrations of the present invention have been shown in detail with reference to preferred embodiments as well as modifications thereof, it is to be understood by those skilled in the art that the foregoing and other modifications are exemplary only, and that equivalent changes in the process and details may be employed, without departing from the spirit and scope of the invention, which is defined by the appended claims.

What is claimed is:

1. A process for improving a solid/liquid separation of slurries from acidulated or non-acidulated liquors obtained by leaching phosphate ores or phosphatic clay wastes comprising:

adding a mixture of flocculating amount of dissolved polymers of hydroxyalkyl cellulose and polyethylene oxide into an aqueous slurry of the leached phosphate wastes or ores to provide flocks, wherein said hyroxyalkyl cellulose is selected from the group consisting of hydroxypropyl cellulose and hydroxyethyl cellulose, said hydroxyalkyl cellulose has a molecular weight greater than 1,000,000, and said polyethylene oxide has a molecular weight greater than 5,000,000, and the amount of each polymer added is from about 0.02 to 0.50 lb/ton of slurried solids;

allowing said flocks to settle into an agglomerated mass; and decanting liquid from insoluble residues having a solid content of from about 55 to about 70%.

2. The process of claim 1, wherein said polymers are dissolved in a solvent selected from the group consisting of methanol, water and acetone.

3. The process of claim 2, wherein the amount of each polymer is added in about 0.1 lb/ton of slurried solids.

4. The process of claim 3, wherein said mixture of hydroxyalkyl cellulose and polyethylene oxide added to said slurry is obtained by adding the hydroxypropyl cellulose prior to the addition of polyethylene oxide.

5. The process of claim 4, wherein the hydroxypropyl cellulose is added in an aqueous solution.

6. The process of claim 1, wherein hydroxyethyl cellulose is dissolved in water and polyethylene oxide is dissolved in methanol.

7. The process of claim 6, wherein hydroxyethyl cellulose is added in amounts from about 0.05 to about 0.15 lb/ton of slurried solids and polyethylene oxide is added in the amounts from about 0.05 to about 0.10 lb/ton of slurried solids.

8. The process of claim 1, wherein hydroxyethyl cellulose is dissolved in water and polyethylene oxide is dissolved in water.

9. The process of claim 8, wherein ratios of hydroxyethylcellulose to polyethylene oxide are from 1:1 to 3:1.

10. The process of claim 9, wherein said liquor is acidulated with hydrochloric acid; the amount of hydroxyethyl cellulose is from about 0.20 to about 0.40 lb/ton of slurried solids; and the amount of polyethylene oxide is from about 0.12 to about 0.52 lb/ton of slurried solids.

11. A process for improving a solid/liquid separation of slurries from acidulated or non-acidulated liquors obtained by leaching phosphate ores or phosphatic clay wastes comprising:

adding a mixture of a flocculating amount of dissolved polymers of hydroxyethyl cellulose and polyacrylamide into an aqueous slurry of the leached phosphate wastes or ores to provide flocks of phosphatic clay wastes wherein said hydroxyethyl cellulose has a molecular weight greater than 1,000,000, said polyacrylamide is an anionic polyacrylamide having a molecular weight greater than 10,000,000, and the amount of each polymer added is from about 0.05 to 1.5 lb/ton of slurried solids allowing said flocks to settle into an agglomerated mass; and decanting liquid from insoluble residues having a solid content of from about 55 to about 70%.

12. The process of claim 11, wherein the amount of polymers are added in at least about 0.10 lb/ton.

13. A process for improving a solid/liquid separation of slurries from acidulated or non-acidulated liquors obtained by leaching phosphate ores or phosphatic clay wastes comprising:

adding a mixture of a flocculating amount of dissolved polymers of polyethylene oxide, hydroxypropyl cellulose and polyethylene glycol into a slurry of the leached phosphate wastes or ores to provide flocks of phosphatic wastes, wherein said hydroxypropyl cellulose has a molecular weight greater than 1,000,000, said polyethylene oxide has a molecular weight greater than 5,000,000, and the polyethylene oxide and hydroxypropyl are each added in an amount of from about 0.02 to 0.50 lb/ton of slurried solids;

allowing said flocks to settle into an agglomerated mass; and decanting liquid from insoluble residues having a solid content of from about 55 to 70%.

14. The process of claim 13, wherein said polymers are dissolved in methanol.

15. The process of claim 14, wherein said liquor is acidulated with sulfuric acid; the amount of added polyethylene oxide is from about 0.10 to 0.50 lb/ton of slurried solids; the amount of added hydroxypropyl cellulose is about 0.05 lb/ton of slurried solids; and the amount of added polyethylene glycol is from about 0.05 to about 0.25 lb/ton slurried solids.

* * * * *